(12) United States Patent
Gapp

(10) Patent No.: US 8,113,073 B2
(45) Date of Patent: Feb. 14, 2012

(54) LEAD SCREW NUT SUPPORT ARRANGEMENT

(75) Inventor: Andreas Gapp, Donaueschingen (DE)

(73) Assignee: IMS Gear GmbH, Donaueschingen (DE)

( * ) Notice: Subject to any disclaimer, the term of this patent is extended or adjusted under 35 U.S.C. 154(b) by 457 days.

(21) Appl. No.: 11/298,921

(22) Filed: Dec. 9, 2005

(65) Prior Publication Data

US 2006/0123938 A1   Jun. 15, 2006

(30) Foreign Application Priority Data

Dec. 9, 2004   (DE) .................... 10 2004 059 538

(51) Int. Cl.
*F16H 25/20* (2006.01)
(52) U.S. Cl. .......... 74/89.23; 74/89.42; 74/409; 74/440; 74/441
(58) Field of Classification Search .......... 74/89.23, 74/89.36, 89.42, 424.71, 409, 411, 440, 441; 403/228, 229, 359.4; 359/694; 384/266, 384/272, 227, 228, 235, 257
See application file for complete search history.

(56) References Cited

U.S. PATENT DOCUMENTS

| | | | | |
|---|---|---|---|---|
| 3,122,936 A | * | 3/1964 | Dykes ........................... 74/335 |
| 3,822,024 A | * | 7/1974 | Endter et al. ............... 414/796.6 |
| 4,022,300 A | * | 5/1977 | Afanador et al. ............ 188/72.1 |
| 4,036,330 A | * | 7/1977 | Henning et al. ............. 188/72.8 |
| 4,207,784 A | * | 6/1980 | Exner et al. ...................... 81/54 |
| 4,406,352 A | * | 9/1983 | Scott et al. .................. 188/72.8 |
| 4,442,725 A | * | 4/1984 | Urabe ......................... 74/89.36 |
| 4,498,350 A | * | 2/1985 | Ross ........................... 74/89.42 |
| 4,802,374 A | * | 2/1989 | Hamelin et al. ............ 74/89.14 |
| 5,251,986 A | * | 10/1993 | Arena .......................... 384/272 |
| 6,761,080 B2 | * | 7/2004 | Lange et al. ................ 74/89.37 |
| 6,807,877 B2 | * | 10/2004 | Sato et al. .................... 74/89.37 |
| 2004/0206195 A1 | | 10/2004 | Landskron et al. ................ 27/2 |

FOREIGN PATENT DOCUMENTS

| | | | | |
|---|---|---|---|---|
| DE | 33 27 946 | | 3/1988 | ........................ 25/20 |
| DE | 44 34 401 | | 11/1995 | ........................ 25/20 |
| JP | 57-171115 | | 10/1982 | .......................... 23/4 |
| WO | WO 01/27482 | | 4/2001 | .......................... 25/4 |

* cited by examiner

*Primary Examiner* — James Pilkington
*Assistant Examiner* — Thomas Diaz
(74) *Attorney, Agent, or Firm* — O'Shea Getz P.C.

(57) ABSTRACT

A lead screw nut support arrangement includes a wall having a width and a through hole that passes through the wall. A support bushing passes through the through hole in the axial direction, leaving an amount of play, and having a length greater than the thickness of the wall. The support bushing is supported in the through hole movably in the axial direction. A lead screw nut is also included whose end face adjoins a first end face of the support bushing on the inner side of the wall. The support arrangement also includes a mount that braces a second end face of the support bushing against the lead screw nut such that the lead screw nut is elastically loaded in the direction away from the wall.

15 Claims, 3 Drawing Sheets

LEAD SCREW NUT SUPPORT ARRANGEMENT

PRIORITY INFORMATION

This patent application claims priority from German patent application 10 2004 059 538.0 filed Dec. 9, 2004, which is hereby incorporated by reference.

BACKGROUND OF THE INVENTION

This invention relates in general to lead screws and in particular to a lead screw nut support arrangement.

A lead screw nut support arrangement includes a lead screw nut supported by its end face in a wall of a housing that is rotatable about the longitudinal axis. A through hole passes through the wall to guide a shaft through the wall and through a through hole in the lead screw nut for engagement with the lead screw nut. The wall is part of a housing in which the lead screw nut is accommodated. The housing may be a gearbox housing of a lead screw drive.

Such an arrangement has the disadvantage that there is usually a clearance between the end faces of the lead screw nut and the adjacent walls. As a result, the lead screw nut has undesired play in the housing in the axial direction of the lead screw nut.

What is needed is a lead screw nut support arrangement that supports the lead screw nut in the housing with reduced play.

SUMMARY OF THE INVENTION

A lead screw nut support arrangement includes a wall having a width and a through hole that passes through the wall. A support bushing passes through the through hole in the axial direction, leaving an amount of play, and having a length greater than the width of the wall. The support bushing is supported in the through hole movably in the axial direction. A lead screw nut is also included whose end face adjoins a first end face of the support bushing on the inner side of the wall. The support arrangement also includes a mount that braces a second end face of the support bushing against the lead screw nut such that the lead screw nut is elastically loaded in the direction away from the wall.

An elastic element may be arranged between the mount and the second end face of the support bushing. The elastic element may stress the support bushing against the lead screw nut. Alternatively, the elastic element may be arranged between the support bushing and the lead screw nut such that it stresses the lead screw nut away from the support bushing. The elastic element may comprise an elastomer. The support bushing may have collars at its end faces, where the length of the support bushing extends between the collars. The wall may be part of a housing that accommodates the lead screw nut, and the mount may be a lead screw drive mount. The lead screw nut may be supported by such a support arrangement at both ends.

The support bushing may comprise two cylindrical support bushing elements, where the first support bushing element is supported with its cylindrical external circumference in the cylindrical internal circumference of the second support bushing element with the ability to rotate. One or both of the support bushing elements may have a collar. A shaft passage hole may pass through the arrangement of the mount, the support bushing, and the elastic element to allow a lead screw shaft to pass therethrough. The mount may be made of an elastic material that stresses the support bushing against the lead screw nut.

The lead screw nut support arrangement may be employed for longitudinal seat adjustment in motor vehicles.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
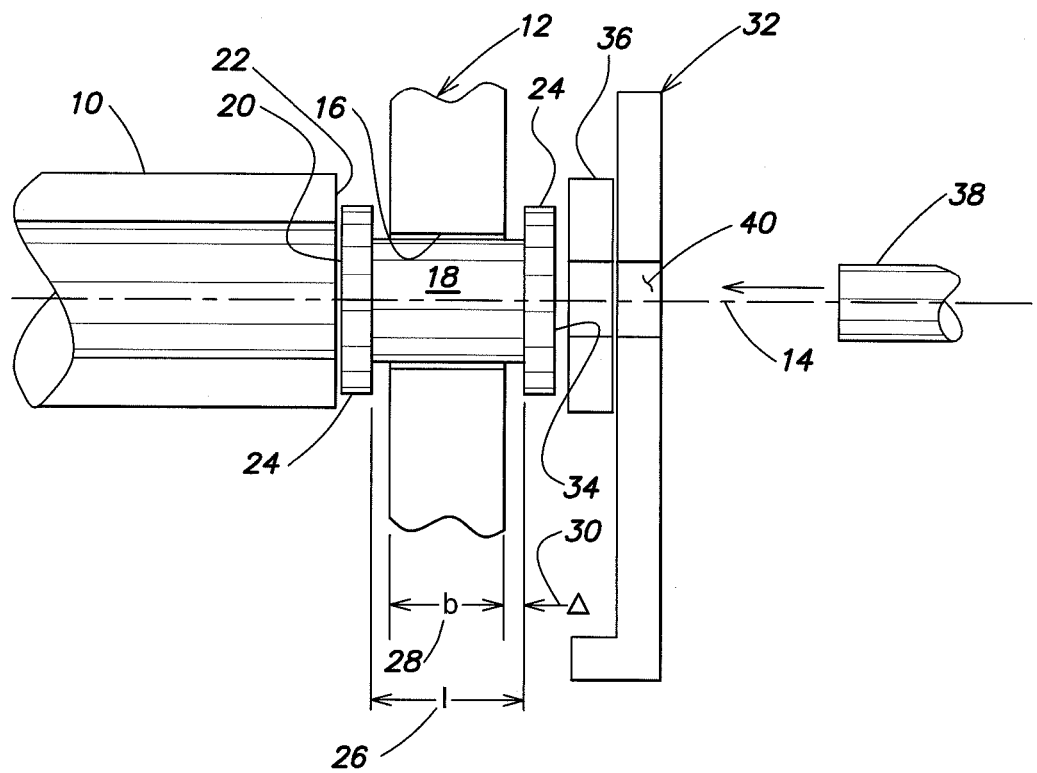
FIG. 1 is a partial sectional view through an enlarged detail of a lead screw nut support arrangement.

A lead screw nut 10 is supported between two walls 12, one of which is shown in FIG. 1. The lead screw nut 10 is supported rotatably about its longitudinal axis 14. A through hole 16 passes through the wall 12. A support bushing 18 is inserted in the through hole 16, and a first end face 20 of the support bushing 18 is adjacent to an end face 22 of the lead screw nut 10. At each end face of the support bushing is a collar 24. However, one or both of the collars 24 may be omitted. Axial length l 26 of the support bushing 18 may be greater than thickness b 28 of the wall 12. As illustrated, the axial length l 26 may be the distance between the two collars 24. This arrangement leaves some axial play Δ30 corresponding to the difference between the length l 26 of the support bushing 18 and the thickness b 28 of the wall 12.

A mount 32 adjoins a second end face 34 of the support bushing 18 or its corresponding second collar 24 with interposition of an elastic element 36. Relative to the wall 12, the mount 32 may be prestressed in the axial direction 14 toward the lead screw nut 10. As a result, the support bushing 18 is elastically prestressed with its first end face 20 against the end face 22 of the lead screw nut 10. Play that is present between the end face 22 of the lead screw nut 10 and the inner surface of the wall 12 because of the prestress is compensated by the play A 30. While a clearance may remain between the end face 22 of the lead screw nut 10 and the inside of the wall 12, the clearance may be insufficient to permit movement or free play of the lead screw nut 10 in the axial direction 14. Because the elastic element 36 is formed from, for example, an elastomer, the lead screw nut 10 is elastically braced in the axial direction relative to the wall 12.

A shaft passage hole 40 passes through the entire arrangement along the axis 14, so that the lead screw shaft 38 can be inserted through the mount 32, the elastic element 36, and the support bushing 18 into the lead screw nut 10.

Figure 2:
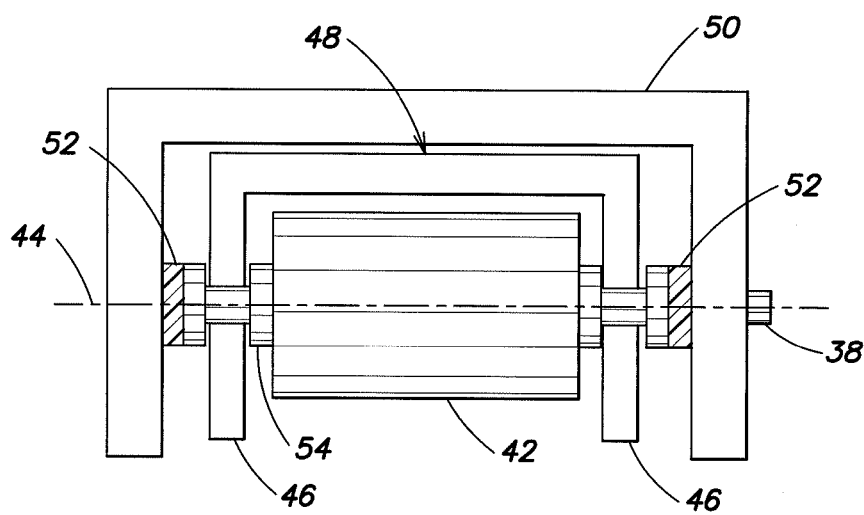
FIG. 2 is a cutaway view of a wall of a housing having a lead screw nut support arrangement in the opposing walls with an enclosing mount.

Referring to FIG. 2, a lead screw nut 42 is supported in its axial direction 44 by a lead screw nut support arrangement between two walls 46 of a housing 48. A mount 50 with two corresponding arms spans the arrangement made up on each side of an elastic element 52, a support bushing 54 and the lead screw nut 42 inserted therebetween. Because the length of both support bushings 54 (which is adjustable in the axial direction 44) is greater than corresponding widths of the two walls 46, the lead screw nut 42 is supported inside the housing 48 without play even though its end faces are spaced away from the insides of the walls 46.

The support bushing 54 may include one collar or no collars at the end faces. Also possible is a slot-shaped through hole from one side wall of the wall 46 to a support region for the support bushing 54, so that a support bushing 54 with two collars can be inserted into the support region.

Figure 3:
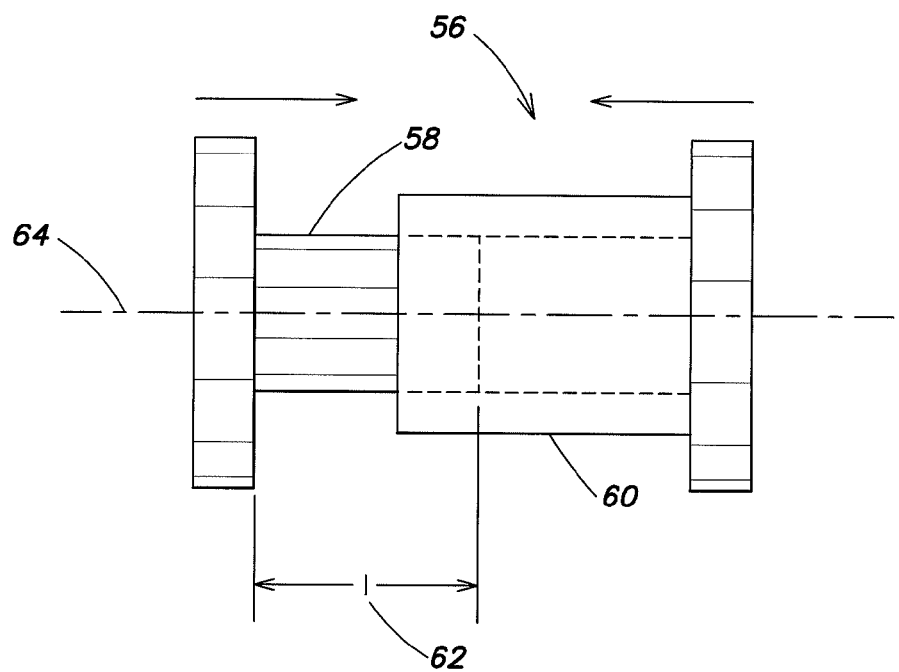
FIG. 3 illustrates a support bushing assembled from two elements.

Referring to FIG. 3, a two-part support bushing 56 includes first and second support bushing elements 58, 60, each comprising a cylindrical section. Axial length l 62 of at least one of the support bushing elements 58 corresponds to an axial length of the support bushing 56. The other support bushing element 60 can have for example a shorter length. The support bushing element 58 may have an outside diameter of the cylindrical section smaller than or approximately equal to the inside diameter of the cylindrical section of the second support bushing element 60. This way, the two support bushing elements 58, 60 can be interlocked and rotate about their longitudinal axis relative to each other. This makes it possible to reduce the frictional resistance upon rotation of the lead screw nut 10 (FIG. 1) between the support bushing 56 and the through hole formed in the wall. Such an arrangement facilitates simple assembly of the support bushing in that the support bushing elements 58, 60 can be inserted from both sides of the wall into the through hole and interlocked.

Figure 4:
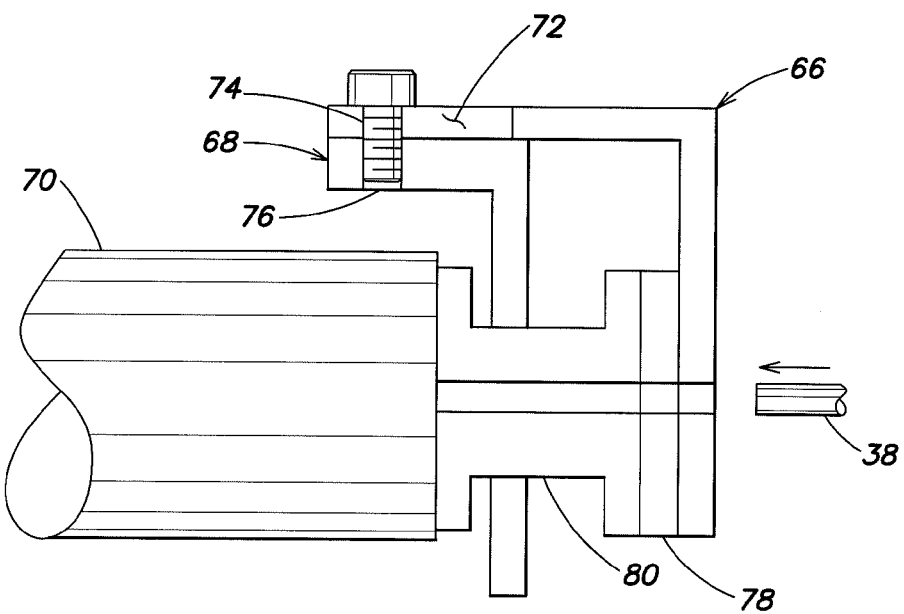
FIG. 4 illustrates a mount attached to a housing.

Referring to FIG. 4, an attachment of the mount 66 directly to another wall 68 of the housing is such that the other wall 68 is a wall that extends parallel to the rotational axis of a lead screw nut 70. The mount 66 is bent at a distance from the support section and runs parallel to the other wall 68. For its attachment, the mount 66 has a longitudinal slot 72 through which the threaded shank 74 of a screw is guided into a tapped hole 76 of the other wall 68. This facilitates alignment of the mount 66 in the axial direction and also prestressing with a desired stress against the arrangement of the elastic element 78, the support bushing 80, and the lead screw nut 70. This mount 66 is thus directly associated with the housing and is not simultaneously acting as a mount to an external component for the lead screw nut and the entire housing.

Figure 5:
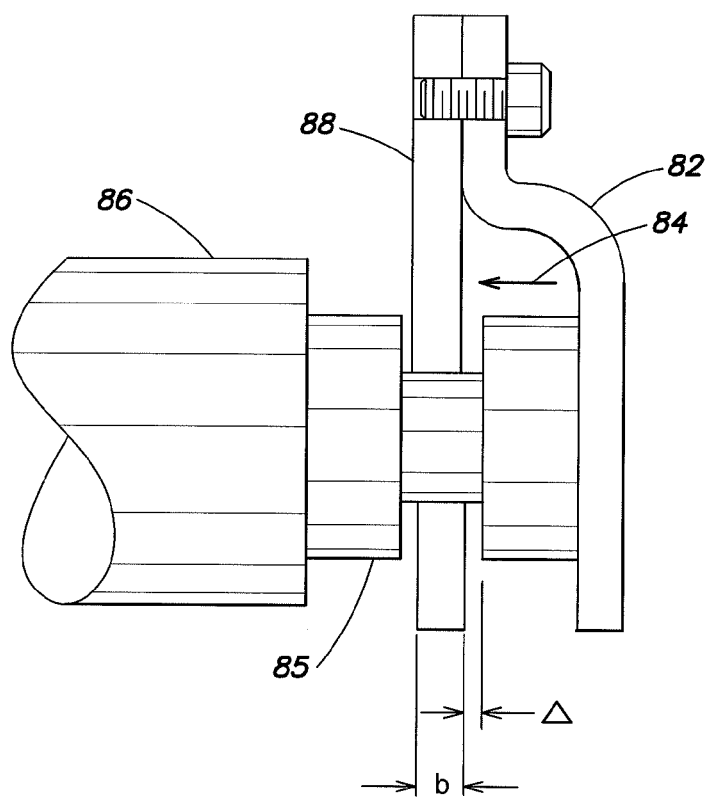
FIG. 5 illustrates an arrangement for attaching a mount to a housing.

Referring to FIG. 5, the mount 82 is preferably made of an elastic material such that the mount 82 presses with its inner wall directly with a stress force 84 against the support bushing 85 in the direction of the lead screw nut 86. The mount 82 may be attached directly to the wall 88, for example with a threaded connection or brazed connection.

Figure 6:
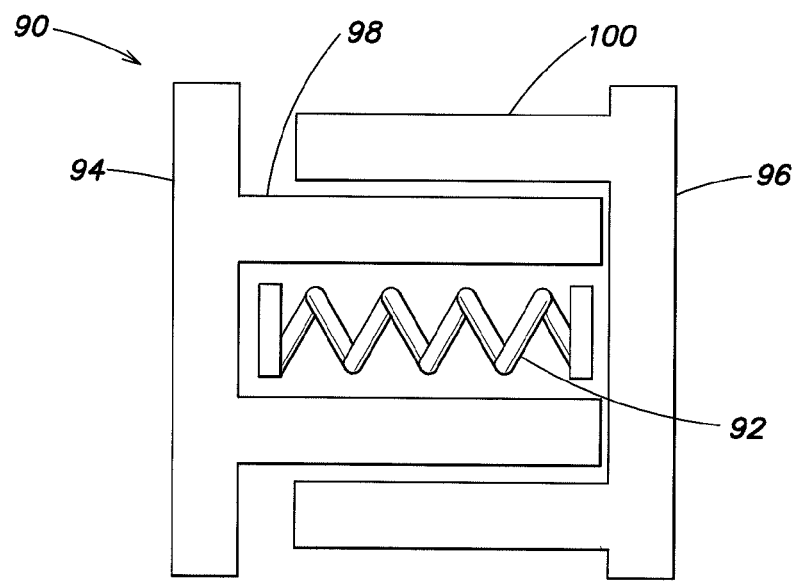
FIG. 6 is a sectional view of a support bushing having two parts.

Referring to FIG. 6, the support bushing 90 differs from the two-part support bushing 56 of FIG. 3 in that an elastic element 92 (e.g., in the shape of a coil spring) is inserted between the walls of the end faces 94, 96 in the interior. The elastic element 92 presses the two support bushing elements 98, 100 away from each other and thus takes over the function of the elastic element 36 inserted at the end face of the support bushing 18 in the arrangement of, for example, FIG. 1.

As set forth above, a number of embodiments are described and illustrated in which the free play Δ of the lead screw nut in the housing is taken up by two support bushings placed at both ends. The support bushings are accommodated in the housing of the gearbox via their shape, in that the support bushings are pressed toward the lead screw nut up to the limit stop by an elastic element. The support bushings have play relative to the housing thickness or width of the walls to permit axial displacement of the support bushings. The elastic element, as an elastomer part, is braced for example from outside via the mount of the lead screw drive. The lead screw nut may be made with hemigloboidal teeth having a cylindrical portion, so that thrust washers can be omitted.

Although the present invention has been shown and described with respect to several preferred embodiments thereof, various changes, omissions and additions to the form and detail thereof, may be made therein, without departing from the spirit and scope of the invention.

What is claimed is:

1. A lead screw nut support arrangement, comprising:
    a wall having a predetermined thickness and a through hole that passes through the wall;
    a support bushing disposed in the through hole in an axial direction, the support bushing having a length greater than the thickness of the wall such that an amount of axial play exists between the support bushing and the wall so that the support bushing is movable in the axial direction, the support bushing includes a first collar extending radially outward from the support bushing on a first axial side of the wall and comprising a first collar end face, and a second collar extending radially outward from the support bushing on a second axial side of the wall and comprising a second collar end face;
    a lead screw nut having an end face that adjoins the first collar end face of the support bushing; and
    a mount that braces the second collar end face of the support bushing with an elastic element positioned between the second collar and the mount such that the lead screw nut is elastically loaded in a direction away from the wall.

2. The lead screw nut support arrangement of claim 1, wherein the elastic element stresses the support bushing against the lead screw nut.

3. The lead screw nut support arrangement of claim 2, where the elastic element comprises an elastomer.

4. The lead screw nut support arrangement of claim 1, where the wall comprises a wall of a housing that accommodates the lead screw nut.

5. The lead screw nut support arrangement of claim 1, where the mount comprises a lead screw drive mount.

6. The lead screw nut support arrangement of claim 1, where the support bushing comprises two cylindrical support bushing elements, and where the first support bushing element is rotatably supported with its cylindrical external circumference in the cylindrical internal circumference of the second support bushing element.

7. The lead screw nut support arrangement of claim 1, where the mount and the support bushing each includes a hole oriented along an axis of rotation for guiding a lead screw shaft through.

8. The lead screw nut support arrangement of claim 1, where the mount comprises an elastic material and stresses the support bushing against the lead screw nut.

9. A lead screw nut support arrangement that interfaces with a wall having a through hole formed therein, the support arrangement comprising:
    a support bushing disposed in the through hole in an axial direction, the support bushing having a length greater than the thickness of the wall such that an amount of axial play exists between the support bushing and the wall so that the support bushing is movable in the axial direction, the support bushing includes a first collar extending radially outward from the support bushing on a first axial side of the wall and comprising a first collar end face, and a second collar extending radially outward from the support bushing on a second axial side of the wall and comprising a second collar end face;

a lead screw nut having an end face that adjoins the first collar end face of the support bushing; and a mount that braces the second collar end face of the support bushing with an elastic element positioned between the second collar and the mount such that the lead screw nut is elastically loaded in a direction away from the wall.

10. The lead screw nut support arrangement of claim 9, wherein the elastic element stresses the support bushing against the lead screw nut.

11. The lead screw nut support arrangement of claim 9, where the support bushing includes a collar disposed at least at one of the first and second end faces of the support bushing.

12. The lead screw nut support arrangement of claim 9, where the support bushing comprises two cylindrical support bushing elements, and where the first support bushing element is rotatably supported with its cylindrical external circumference in the cylindrical internal circumference of the second support bushing element.

13. The lead screw nut support arrangement of claim 9, where the mount and the support bushing each includes a hole oriented along an axis of rotation for guiding a lead screw shaft through.

14. The lead screw nut support arrangement of claim 9, where the mount comprises an elastic material and stresses the support bushing against the lead screw nut.

15. A lead screw nut support arrangement that interfaces with a wall having a through hole formed therein, the support arrangement comprising:

a support bushing disposed in the through hole in an axial direction, the support bushing having a length greater than the thickness of the wall such that an amount of axial play exists between the support bushing and the wall so that the support bushing is movable in the axial direction, the support bushing includes a first collar extending radially outward from the support bushing on a first axial side of the wall and comprising a first collar end face, and a second collar extending radially outward from the support bushing on a second axial side of the wall and comprising a second collar end face;

a lead screw nut having an end face that adjoins the first collar end face of the support bushing; and a mount that braces the second collar end face of the support bushing with an elastic element positioned between the second collar and the mount such that the lead screw nut is elastically loaded in a direction away from the wall; and said elastic element comprising an elastomeric material, and where the elastomeric material element stresses the support bushing against the lead screw nut.

* * * * *